No. 737,020. PATENTED AUG. 25, 1903.
F. A. REYNOLDS.
HYDROCARBON BURNER.
APPLICATION FILED FEB. 8, 1902.
NO MODEL.
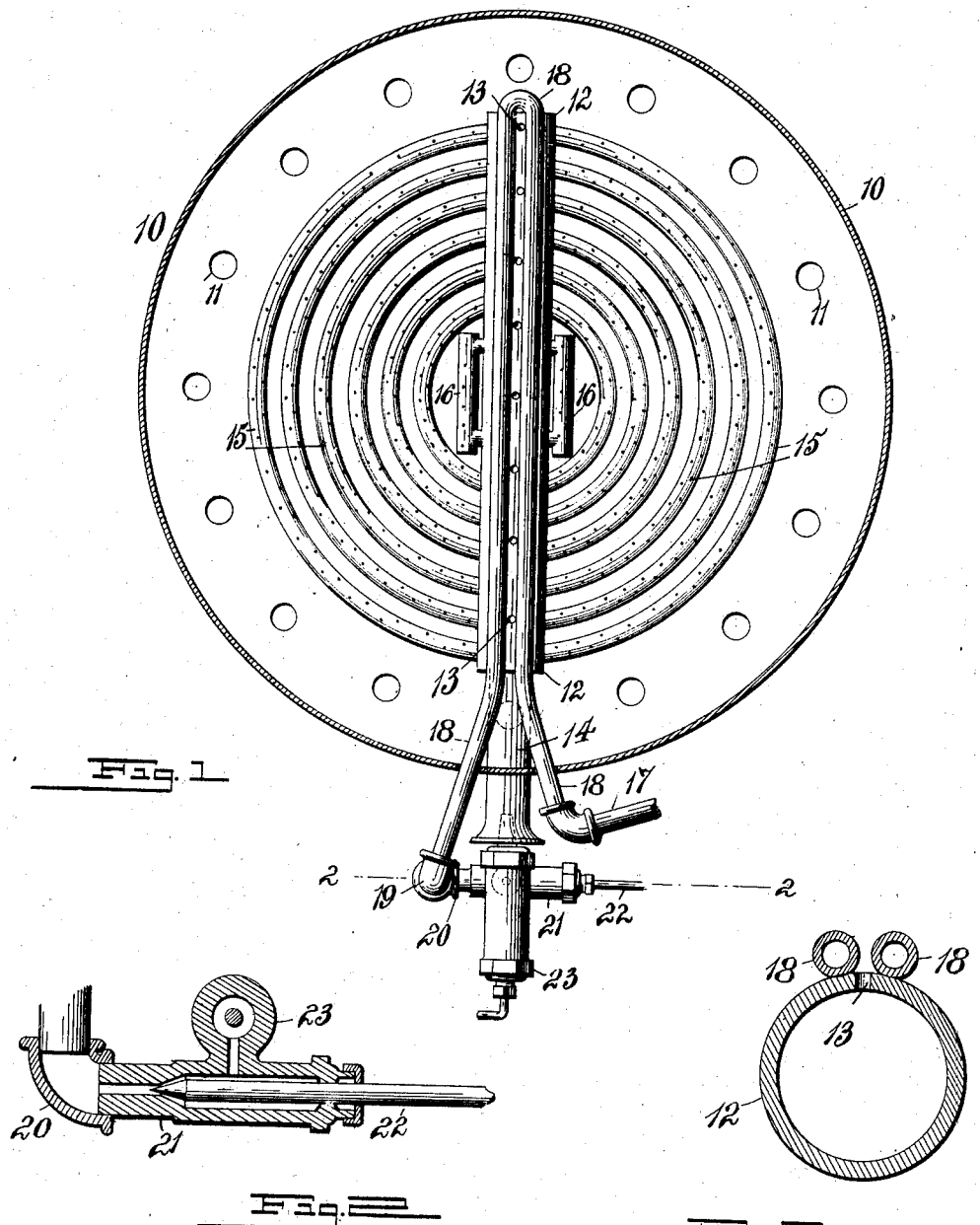
WITNESSES:
INVENTOR
Frank A. Reynolds,
BY
W. B. Hutchinson,
ATTORNEY No. 737,020. Patented August 25, 1903.

UNITED STATES PATENT OFFICE.

FRANK A. REYNOLDS, OF LEWISTON, MAINE, ASSIGNOR, BY MESNE ASSIGNMENTS, TO F. A. THOMSON, TRUSTEE, OF NEW YORK, N. Y.

HYDROCARBON-BURNER.

SPECIFICATION forming part of Letters Patent No. 737,020, dated August 25, 1903.

Application filed February 8, 1902. Serial No. 93,159. (No model.)

*To all whom it may concern:*

Be it known that I, FRANK A. REYNOLDS, of Lewiston, county of Androscoggin, State of Maine, have invented certain new and useful Improvements in Hydrocarbon-Burners, of which the following is a full, clear, and exact description.

My invention relates to improvements in hydrocarbon-burners, and especially to the class of burners adapted for use under automobile or other small boilers, though the burner can of course be used for any ordinary heating purpose.

The object of my invention is to produce a burner of the greatest simplicity, which will practically make complete combustion of gasolene or similar fuel which is easily volatilized, to arrange the parts so that they can be easily renewed and gotten at, and in general to make a cheap, practical, and efficient burner.

A further object of the invention is to furnish a burner that is flat, so as to enable it to be brought close up to the medium to be heated, and at the same time have the volatilizing apparatus add very little to the size of the burner, by reason of its construction being also laid out on lines to prevent its interfering with the aforesaid proximity of the burner to the boiler or other device to be heated.

To these ends my invention consists of certain features of construction and combinations of parts, which will be hereinafter described and claimed.

Reference is to be had to the drawings, forming part of this specification, in which similar figures of reference refer to similar parts throughout the several views.

Figure 1 is a plan view of the burner, showing the same in position in the combustion-chamber of a boiler-casing, the latter being shown in section. Fig. 2 is a detail section on the line 2 2 of Fig 1, and Fig. 3 is a detail cross-section through the main tube or mixer of the burner.

I have shown my invention in connection with a customary type of boiler-casing 10, having the usual air-holes 11 in the bottom, and the burner has a central transverse tube 12, which serves as a mixer, the tube being perforated on the top, as illustrated at 13, so that the gas may issue through the holes, and at its inlet end the mixer is provided with an inlet-tube 14, which extends through the casing 10 and is of ordinary form.

The burner is generally flat and almost circular in shape, and it has a series of small concentric pipes 15, arranged on opposite sides of the mixer, with which the pipes connect at both ends, and these pipes are placed as thickly as possible and pierced on top with numerous perforations through which the gas issues as it is consumed. Within the inner pipes 15 are pipes 16, which lie parallel with the mixer 12 and are connected near both ends with the mixer, the pipes 16 being also perforated on top for the passage of gas. When the fuel-supply is shut down to an extent which prevents the gas from issuing out of the perforations in the pipes 15 and 16, it will still issue from the perforations 13 in the mixer 12, burning with a small flame, and so when the larger supply of fuel is turned on ignition is effected by means of the aforesaid perforations 13 in the mixer 12.

The fuel-supply to the burner comes from the pipe 17, which can be connected with any convenient source of supply, and this delivers to the volatilizer 18, which is of the simplest character, being made in the form of a narrow U-shaped loop and lying flat upon the mixer 12, as the drawings clearly show. The discharge end of the volatilizer 18 connects, by means of the connections 19 and 20, with the valve 21, which is of the usual kind and has the customary piston 22, which can be operated by any preferred form of diaphragm-regulator, so as to control the passage of vapor through the valve.

The valve 21 discharges into a valve 23 of the usual kind, which is arranged at right angles to the valve 21, and the two valve-casings may conveniently be cast in a single piece, as illustrated. The valve 23 has its nozzle arranged to deliver into the inlet-tube 14, and so to the burner.

It will be observed that this makes a burner of great simplicity, and I have found in actual practice that it works to perfection. One particular advantage is that it can be started so easily. By turning on the fuel-supply and simply holding a match under the connection 20 the fuel will be volatilized sufficiently to start the burner, after which it takes care of itself.

It will be noticed that the fuel will be volatilized in the volatilizer 18, that the vapor will pass through the valves 21 and 23 to the mixer 12, and that a large burning-surface is provided by the several pipes and tubes of the burner.

Having now fully described my invention, what I claim as new, and desire to secure by Letters Patent, is—

A hydrocarbon-burner, comprising a substantially flat main portion consisting of a transverse mixer provided with a longitudinal series of perforations, a series of concentric tubes arranged on each side of the mixer and connected therewith, said concentric tubes being provided with burner-openings, a volatilizer comprising a tube folded upon itself and resting on the upper surface of the mixer on either side of and adjacent to the perforations therein, the space between the two arms of the tube forming an outlet for the flame from the mixer, both ends of the volatilizer projecting from the same end of the mixer, and a valve receiving the discharge from the volatilizer and discharging into the mixer.

In testimony whereof I have signed my name to this specification in the presence of two subscribing witnesses.

FRANK A. REYNOLDS.

In presence of—
HELEN L. OBERLEUFFER,
THERON DAVIS.